United States Patent [19]
DiCarlo et al.

[11] Patent Number: 4,903,958
[45] Date of Patent: Feb. 27, 1990

[54] BALLOON AMUSEMENT DEVICE

[75] Inventors: Fernando DiCarlo, 407 W. "C" St., Ontario, Calif. 91762; Tony DiCarlo, Ontario, Calif.

[73] Assignee: Fernando DiCarlo, Ontario, Calif.

[21] Appl. No.: 299,321

[22] Filed: Jan. 23, 1989

[51] Int. Cl.[4] .................................................. B64B 1/50
[52] U.S. Cl. .................................. 272/27 N; 272/8 N; 446/220; 116/210; 116/DIG. 9; 40/547
[58] Field of Search ........... 272/8 R, 8 N, 8 D, 27 R, 272/27 N; 446/220-226; 116/210, 209, DIG. 8, DIG. 9; 40/212-215, 547

[56] References Cited

U.S. PATENT DOCUMENTS

| | | | |
|---|---|---|---|
| 3,892,081 | 7/1975 | Goral | 446/220 X |
| 3,938,466 | 2/1976 | Crissman | 116/DIG. 9 |
| 4,020,786 | 5/1977 | Kopeika | 116/DIG. 9 |
| 4,123,987 | 11/1978 | Singerle et al. | 116/DIG. 8 |
| 4,295,438 | 10/1981 | Porter | 116/210 |
| 4,586,456 | 5/1986 | Forward | 116/210 |
| 4,787,575 | 11/1988 | Stewart | 116/210 X |
| 4,800,835 | 1/1989 | Mears | 116/210 |

*Primary Examiner*—Richard E. Chilcot, Jr.
*Attorney, Agent, or Firm*—Boniard I. Brown

[57] ABSTRACT

An amusement device constructed to simulated a gift package, e.g. for a birthday, or for Christmas. The package is subdivided into a compressed air chamber and a balloon storage compartment. When the person receiving the gift package attempts to open it, the balloon is automatically inflated so as to pop out of the package.

27 Claims, 1 Drawing Sheet

BALLOON AMUSEMENT DEVICE

BACKGROUND OF THE INVENTION

This invention relates to an amusement device in the nature of a surprise trick gift. Principal use of this trick gift would be on the occasion of a person's birthday, wedding anniversary, bridal shower, or Christmas, i.e. an occasion where the person is expecting to receive a gift.

The amusement device can take the form of a package that is internally constructed to include a compressed air container and a deflated balloon located in a storage compartment separate from the container. When the person receiving the package opens it up, the balloon automatically inflates so as to pop up out of the partially opened package. The balloon surface carries a printed message, such as "Happy Birthday Mike."

Prior to my invention, others have suggested devices wherein balloons are automatically inflated with compressed gas from associated containers. U.S. Pat. No. 4,219,819 to R. Patel shows a safety device used by a person lost at sea. The device includes a balloon 10 that is connected to a helium container 7 via a valve 9. When retainer strap 14 is broken a compression spring 15 forces container 7 out of casing 1. Valve 9 is opened by the action of a second spring 37, such that balloon 10 is caused to be inflated with helium. Since helium is lighter than air the balloon and associated container 7 will rise into the atmosphere to provide a visible indication of the fact that a person is in distress. The balloon and associated helium container are attached to a long string or line 21 that unwinds from a spindle 22 mounted in casing 1. The balloon thus remains in an overhead position 600 feet or more above the lost person rather than floating away with the wind.

SUMMARY OF THE INVENTION

As previously noted, my invention contemplates an amusement device wherein compressed air is used to automatically inflate a balloon when a package containing the air source is opened. Structurally, the amusement device bears a superficial resemblance to the device shown in aforementioned U.S. Pat. No. 4,219,819. However, there are certain differences. For example, I use compressed air for balloon inflation purposes, such that after the inflation process the balloon remains attached to the associated package structure. In contrast, the system of U.S. Pat. No. 4,219,819 utilizes a gas (helium) that is lighter than air, whereby the balloon and gas container are caused to float several hundred feet up into the atmosphere. The arrangement of U.S. Pat. No. 4,219,819 is unsuited for use as a novelty balloon gift package of the type contemplated in the present invention.

One object of the present invention is to provide a trick gift balloon amusement device that is capable of manufacture at relatively low cost.

Another object of the invention is to provide a trick gift amusement device that can be reused a number of times.

A further object of the invention is to provide a trick gift balloon amusement device that can be used for a number of different occasions, e.g. birthdays, anniversaries, etc., merely by changing the message printed on the balloon.

A further object is to provide an amusement device that can be sent through the mails without fear that the balloon will prematurely inflate during transit.

An additional object of the invention is to provide a gift balloon amusement device wherein the compressed air container can be placed on a table after the balloon has been inflated. The container and inflated balloon can be used as a festive table ornament during a birthday party, wedding reception, etc.

THE DRAWINGS

DESCRIPTION OF A PREFERRED EMBODIMENT OF THE INVENTION

Figure 1:
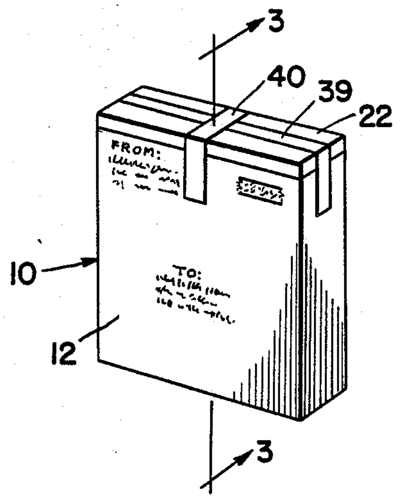
FIG. 1 is a perspective view of an amusement device constructed according to the invention.

FIGS. 1 through 4 show an amusement device embodying the invention. The device comprises a compressed air container 10 having a front wall 12, rear wall 14, bottom wall 16 and two end walls 18. The container is closed at its top by a wall 20 that is normally concealed from view by a movable wall structure 22. Structure 22 is sometimes hereinafter referred to as a lid structure.

The illustrated compressed air container 10 has a three dimensional rectangular configuration, such that the assembly of container 10 and wall (lid) structure 22 resembles a gift box, i.e., a box used to contain a birthday gift, wedding gift, etc. The simulated (fake) gift box may have an outer surface formed of a material suitable for writing a person's home address thereon.

The container walls 12, 14, 16, 18 and 20 are preferably formed at least partly out of a relatively light weight plastic material having sufficient strength to contain compressed air within container space 23. If desired, internal connector strips 24 may be adhesively attached to inner face areas of walls 12 and 14 to resist any tendency of these walls to bow outwardly due to forces associated with the compressed air charged into container space 23. As noted, the container walls are preferably light plastic, such that the FIG. 1 assembly can be sent through the mails without excessive postage costs.

Although the recipients mailing address can be printed directly on the outer surface of the plastic container, the preferred arrangement is to cover the plastic box structure with an ornamental gift wrapping material, not shown. An outer kraft paper covering is provided over the gift wrapping material, whereby the wrapped package is suitable for mailing to the recipient in conventional fashion. If the gift-wrapped package is to be presented to the recipient in person, then of course the kraft mailing paper covering is not used.

Compressed air may be charged into container 10 through a conventional check valve 26 of the type normally used to inflate tires, air inflation toys, air-inflated balls, etc. Wall 16 of the container is preferably recessed at the point where check valve 26 is mounted, such that when a gift wrapping is placed around the container there is no protuberance that could be damaged during mailing or handling. Check valve 26 can be a conventional hardware item Wall 20 of the container has a peripheral flange 28 extending away from the container. The associated lid structure 22 comprises a flat rectangular panel having a peripheral rim wall 30 adapted to telescopically fit onto the peripheral flange 28 of container 10. Rim wall 30 has an outer surface that forms a continuation of the container outer surface, such that wrapping paper can be applied over the wall surfaces without producing an unsightly bulge. The aim is to provide a package that effectively simulates a box containing a gift, e.g.. birthday gift, anniversary gift, job retirement gift, etc.

The internal space between wall structure 22 and concealed wall 20 forms a balloon storage compartment 32. A conventional deflated balloon 34 is located within compartment 32, with inflation neck 36 of the balloon stretched onto a short hollow air tube 38 that extends from wall 20 into compartment 32. A twist wire or clamp wire 37 may be tied or placed around the balloon neck to retain same in place on the tube.

Figure 3:
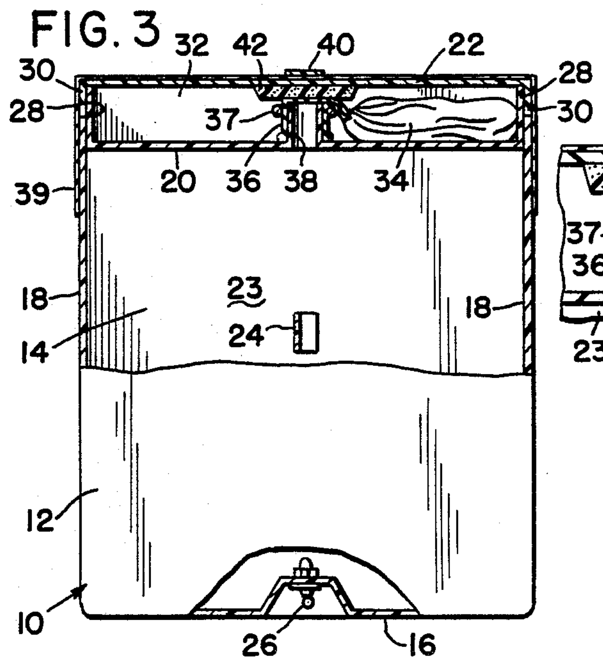
FIG. 3 is a sectional view taken on line 3—3 in FIG. 1.

Tube 38 forms an air discharge port for enabling compressed air to flow from container 10 into balloon 34 when wall structure 22 is released from its FIG. 3 position. One or two adhesive tapes 39 and 40 (FIG. 1) are applied to wall structure 22 and contiguous areas of container 10 to normally retain structure 22 in place on container 10.

A pad 42, formed of a relatively soft resilient elastomeric material, is adhered to the inner face of wall structure 22 in axial alignment with tube 38. When wall structure 22 is installed onto the flanged section of container 10, pad 42 squeezes the neck area of balloon 34 against the end surface of the flow tube 38. Tapes 39 and 40 are then applied to the package, as shown in FIG. 1, to releaseably hold wall structure 22 in place on container 10. At this time the container is empty, i.e. not charged with compressed air.

With the component parts in the FIG. 3 position, compressed air is charged into container 10 through check valve 26, using an air pump or other compressed air source. The compressed air is prevented from passage into the balloon 34, because pad 42 is at this time exerting a squeeze pressure on the neck area of the balloon. Pad 42 constitutes a means controlled by wall structure 22 for preventing flow of compressed air into the balloon.

The resilient compressible nature of pad 42 is of some importance in that the pad can compress locally, i.e. at different points around the circumference of tube 38, so as to maintain the balloon material in a tightly sealed condition. Thus, localized deformation of the pad material can compensate for any unevenness or irregularity in the end surface of tube 38, or any angularity between the tube end surface and the plane of the pad.

Figure 4:
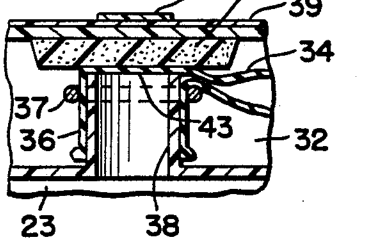
FIG. 4 is an enlarged fragmentary sectional view of a structural detail used in the FIG. 3 assembly.

The compressed air within container 10 exerts a force on the balloon material directly underneath pad 42, i.e. the area designated by numeral 43 in FIG. 4. The compressed air force is related to the tube 38 area and the pressure of the air charged into container 10. The variables are selected so that tapes 39 and 40 are effective to overcome the pneumatic force, such that wall structure 22 is retained in place on the container.

When the recipient of the gift package removes the outer wrapping (ornamental gift wrapping and kraft mailing paper) he/she observes the tapes 39 and 40. The natural inclination is to set the package upright on a table surface so as to more easily remove the tapes. With the package upright, the wall structure 22 will be the top wall of the package. As the tapes are removed, the force holding wall structure 22 in place is progressively reduced.

At some point in the tape removal process the holding force on wall structure 22 will become less than the pneumatic force exerted against area 43 of the balloon. The pneumatic force will then push wall structure 22 upwardly away from tube 38. At the same time the compressed air will inflate the balloon to the inflated condition shown in FIG. 2. Wall structure 22 will be completely separated from container 10.

Depending on the air pressure charged into container 10, balloon wall thickness, and balloon size, the balloon can be inflated to a relatively large impressive dimension, appreciably larger than container 10. The inflation process occurs fairly rapidly, such that the person opening the package is surprised and astonished. The action is entertaining to the assembled guests.

Figure 2:
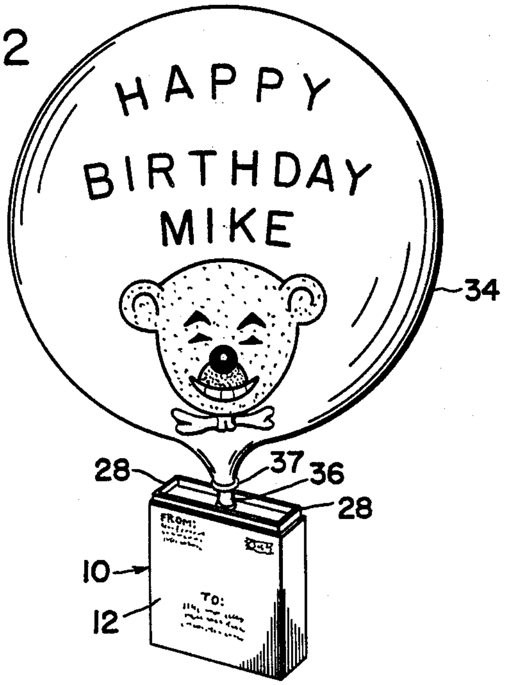
FIG. 2 is a view taken in the same direction after the device has been opened and a balloon inflated.

After the balloon has been inflated to the FIG. 2 condition, container 10 can be placed upright on a table surface to provide a decorative effect during the party, e.g. birthday, retirement party, etc. A message appropriate to the occasion is printed on the balloon surface. The amusement device can be adapted to different occasions by selecting the balloon message appropriate to the occasion.

The aforementioned tube 38 is preferably located at a central point on container wall 20, i.e. midway between end walls 18, 18, and midway between walls 12 and 14. Such a central location gives the amusement device a symmetrical appearance when the balloon is inflated to the FIG. 2 condition. Container 10 can assume an upright condition on a table surface without fear of being tipped over.

A central location of tube 38 may also be beneficial in that during the tape removal process the pneumatic force is exerted at a central point on wall structure 22, thereby giving increased assurance that wall structure 22 will separate correctly from container 10, however the tapes are drawn off of the package, i.e. right to left, or left to right. Tape 40 is applied over tape 39 so that tape 40 is removed first. Tape 39 determines the point at which wall structure 22 will separate from container 10. The telescopic fit of rim wall 30 on container peripheral flange 28 tends to promote an essentially straight upward motion of lid structure 22 away from the container. The central location of tube 38 likewise promotes a straight upward motion of lid structure 22.

Figure 5:
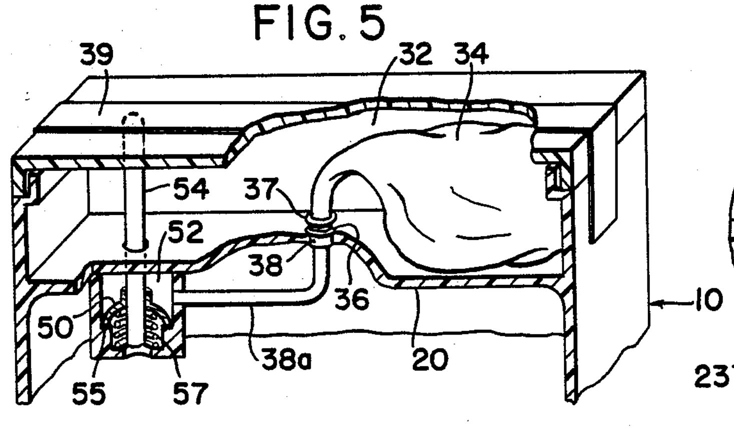
FIG. 5 is a fragmentary sectional view of another form that the invention can take.
Figure 6:
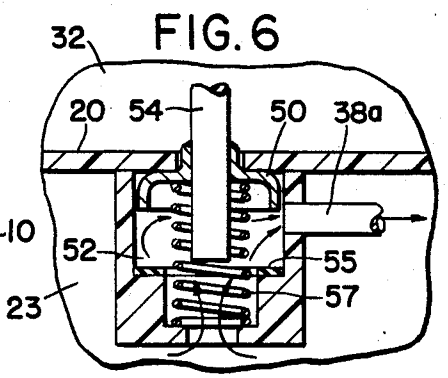
FIG. 6 is an enlarged sectional view of a structural detail used in the FIG. 5 device.

FIGS. 5 and 6 fragmentarily show a second form that the invention can take. In this case the flow-preventing means takes the form of a poppet valve 50 located in a valve chamber 52 that is disposed within compressed air container 10. FIG. 5 shows poppet valve 50 in a closed position; FIG. 6 shows the poppet valve in an open position.

The poppet valve includes a rod element 54 extending into the balloon storage compartment 32 to engage the under surface of wall structure 22. Rod element 54 has a length such that when structure 22 is retained on container 10 (by tape 39), poppet valve 50 will seat against valve seat 55 to prevent flow of compressed air into valve chamber 52.

When tape 39 is drawn away from the package the air pressure on the under surface of poppet valve 50 causes rod element 54 to push wall structure 22 off of container 10. The pneumatic force may be augmented by a compression spring 57, although such a spring is considered primarily a back up to the air pressure. Poppet valve 50 moves to the FIG. 6 open position, permitting compressed air to flow through tube 38*a* and into balloon 34.

Valve chamber 52 could be located in balloon storage compartment 32. However, such a location would detract from the esthetics of the amusement device when the balloon is inflated (as in FIG. 2). Also, it would then be more difficult to locate the discharge end of tube 38*a* at a central point in the compartment. It is preferred to have valve chamber 52 located within the compressed air container (chamber) 10.

The arrangement of FIGS. 5 and 6 operates essentially in the same fashion a the FIG. 3 device. The primary difference in the two devices is in manufacturing cost. The FIG. 3 device has a lower manufacturing cost.

Either device can be reused any number of times, i.e. by applying new adhesive tapes 39 and 40 to the package, and charging compressed air into container 10 through valve 26. Either device can be sent through the mails without fear that the balloon will be inadvertently inflated during transit. Relatively low air pressures are used, such that mailing paper wrapped around the package will adequately reinforce (supplement) the retention capability of tapes 39 and 40.

The use of tapes 39 and 40 is the preferred mechanism for retaining lid structure 22 on container 10. However, conventional latch means can be used in lieu of the tapes. The use of adhesive tapes lends an element of surprise to the amusement device in that the person opening the gift will become engrossed in getting the tape off the package, and will therefore not expect the lid structure 22 to pop off the package during the tape removal process.

Thus there has been shown and described a novel balloon amusement device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventors claim:

1. An amusement device comprising:

a compressed air container having an air discharge port;

a movable wall structure mounted on said container in overlying relation to said air discharge port to form a balloon storage compartment;

a deflated balloon located within said storage compartment, said balloon having an inflation neck in sealed fluid communication with said air discharge port;

means to retain the balloon in fluid communication with the air discharge port;

means controlled by the movable wall structure for preventing the flow of compressed air through the discharge port into the balloon;

whereby movement of the wall structure away from the container permits compressed air to flow into the balloon, the balloon being maintained in fluid communication with said discharge port after inflation of the balloon by the compressed air flow.

2. The amusement device of claim 1, wherein:

said movable wall structure comprises a flat panel having a peripheral rim wall adapted to fit telescopically onto the air container.

3. The amusement device of claim 2, wherein: the peripheral rim wall forms a continuation of the container side walls, whereby the wall structure and container cooperatively form a three dimensional rectangular box.

4. The amusement device of claim 3, and further comprising:

at least one strip of adhesive tape extending across the wall structure and adjacent areas of the container side walls to releasably retain the wall structure on the container.

5. The amusement device of claim 1, and further comprising:

a wrapping material adapted to cover the container and movable wall structure, whereby the covered assembly simulates a gift package.

6. The amusement device of claim 1, wherein:

the balloon bears a message imprinted thereon.

7. The amusement device of claim 1, and further comprising:

a check valve in one wall of said container for charging compressed air into the container.

8. The amusement device of claim 1, wherein:

said container is a hollow rectangular structure having one wall thereof concealed by said movable wall structure, and said air discharge port is located at a central point on said concealed wall.

9. The amusement device of claim 1, wherein:

said container is a hollow rectangular structure having one wall thereof concealed by said movable wall structure, and said air discharge port comprises a hollow tube projecting from said concealed wall into said balloon storage compartment.

10. The amusement device of claim 9, wherein:

said hollow tube is located at a central point on said concealed wall.

11. The amusement device of claim 9, and further comprising:

a peripheral flange extending from the concealed wall in a direction away from the container, and wherein:

said movable wall structure comprises a flat panel having a peripheral rim adapted to fit telescopically onto said peripheral flange.

12. The amusement device of claim 11, wherein:

said movable wall structure is completely separable from the container.

13. The amusement device of claim 1, wherein:

said flow-preventing means comprises a pad carried by the movable wall structure to exert a squeeze pressure on the balloon neck.

14. The amusement device of claim 13, wherein:

said pad is located approximately at the geometrical center of the movable wall structure.

15. The amusement device of claim 13, wherein:

said air discharge port comprises a hollow tube projecting from said container into the balloon storage compartment, and said pad is located in axial alignment with said hollow tube to squeeze the balloon neck material against the tube end surface.

16. The amusement device of claim 15, wherein:
said pad is formed of a resilient compressible material, whereby the pad can conform to irregularities in the tube end surface.

17. The amusement device of claim 1, wherein:
said flow-preventing means is a poppet valve having a disengageable connection with said movable wall structure.

18. The amusement device of claim 17, wherein:
said flow-preventing means further comprises a compression spring engaged with the poppet valve to urge said valve to an open condition when the movable wall structure is moved away from the container.

19. The amusement device of claim 1, wherein:
said flow-preventing means comprises a valve chamber means located within said container in near adjacency to the balloon storage compartment, a poppet valve located within said chamber means, and a rod element extending from the poppet valve into the balloon storage compartment for disengageable connection with said movable wall structure.

20. The amusement device of claim 19, wherein:
said air discharge port comprises a hollow tube extending from the valve chamber means and thence through one wall of the container into the balloon storage compartment.

21. An amusement device comprising:
a container subdivided into a storage compartment and a chamber containing compressed gas,
a balloon sized and adapted when deflated to fit in the storage compartment,
means interconnecting said chamber and the balloon for fluid communication therebetween,
lid structure attached to the container and movable between a closed position wherein the storage compartment is closed and said fluid communication is blocked and an open position wherein there is fluid communication between the chamber and balloon, and
means to releasably retain the lid structure in its said closed position and actuable to release the lid structure to move the lid structure to its said open position by expansion of the balloon by fluid communication between said chamber and the balloon, the balloon being maintained in fluid communication with the discharge port after expansion of the balloon.

22. A device according to claim 21, wherein:
the container has the configuration of a gift package.

23. A device according to claim 21, wherein:
the means to releasably retain the lid structure comprises adhesive tape extending across surface areas of the lid structure and the container.

24. A device according to claim 21, and further including:
a check valve in one wall of the container for charging compressed air into the container.

25. A device according to claim 21, wherein:
said container comprises a hollow generally rectangular structure,
wall means separating the storage compartment from said chamber,
said means interconnecting the chamber and balloon for fluid communication include a discharge port and a tube extending from said wall means and into said storage compartment.

26. A device according to claim 21, and further including:
flow preventing means comprising a poppet valve having a disengageable connection with said lid structure to block said fluid connection when the lid structure is in its closed position.

27. A device according to claim 26, and further including
a compression spring engaged with the poppet valve to urge the valve to an open condition when the lid structure is moved to its open position.

* * * * *